United States Patent Office.

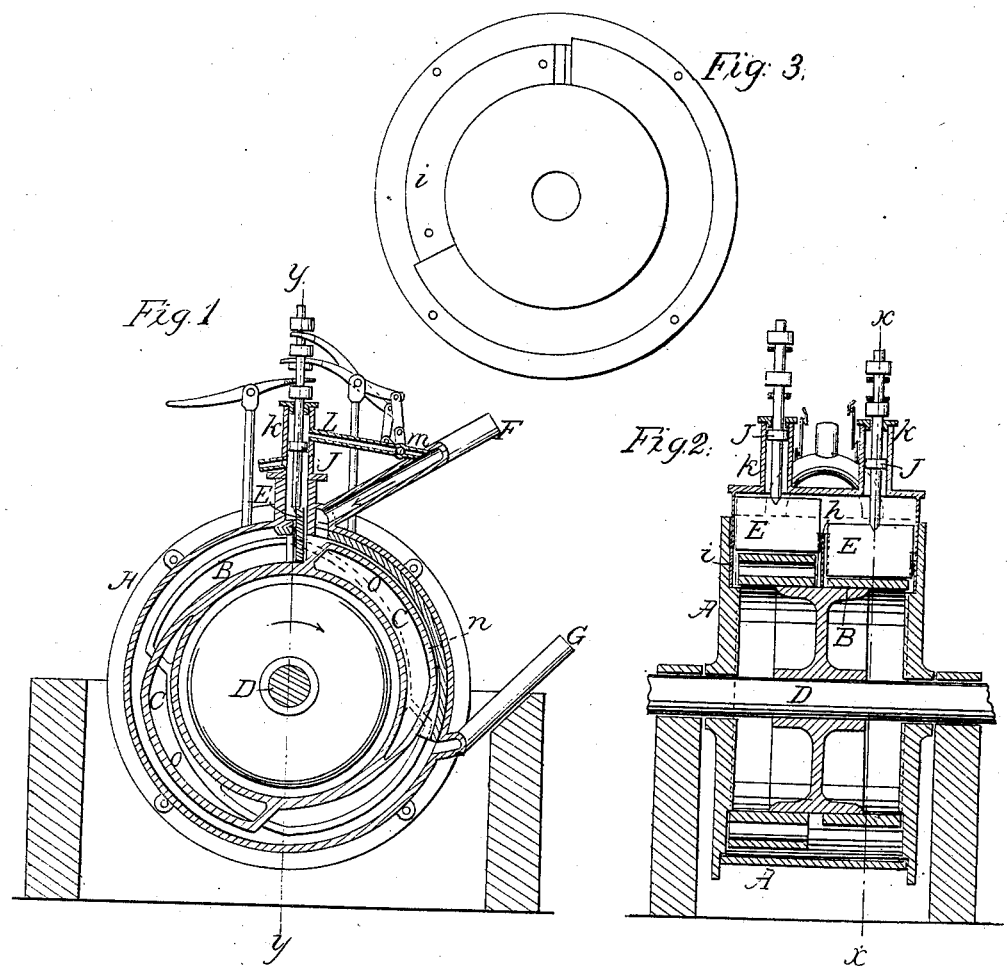

THOMAS A. NIZER, OF HAMILTON, OHIO.

Letters Patent No. 82,149, dated September 15, 1868.

---

IMPROVEMENT IN ROTARY STEAM-ENGINES.

---

The Schedule referred to in these Letters Patent and making part of the same.

---

TO ALL WHOM IT MAY CONCERN:

Be it known that I, THOMAS A. NIZER, of Hamilton, in the county of Butler, and State of Ohio, have invented a new and improved Rotary Steam-Engine; and I do hereby declare that the following is a full, clear, and exact description thereof, which will enable those skilled in the art to make and use the same, reference being had to the accompanying drawings, forming part of this specification.

This invention relates to that class of steam-engines which are known as "rotary engines," and it consists in the construction and arrangement of parts, as hereinafter described.

Figure 1 represents a vertical sectional elevation of the engine through the line $x\ x$ of fig. 2.

Figure 2 is a vertical section of fig. 1, through the line $y\ y$.

Figure 3 is a view of the inside of one of the heads of the cylinder, showing the position of the packing-plate upon the inside.

Similar letters of reference indicate corresponding parts.

To the main shaft is attached a central wheel or cylinder, with inclined planes upon its periphery.

The steam acts against one end of these inclined planes as against pistons.

The abutments or valves are raised by the other ends, and forced down in contact with the cylinder by the pressure of the steam.

A represents the casing,

B the cylinder, and

C the inclined planes.

D is the main shaft.

E represents the abutments or valves.

F is the induction-steam pipe, and

G the eduction or exhaust-pipe.

$h$ represents a fixed partition-plate, which separates the abutment-valves E, as seen in the drawing.

There are two inclined planes, C, with their piston-ends, upon each division of the cylinder, with the piston-ends of each division placed on opposite sides, as seen in the drawing, and the four inclined planes on the cylinder are so arranged that some one of them receives steam at every quarter revolution of the shaft.

It will be seen that the propelling power exerted upon the main shaft is continuous.

$i$ is a packing-plate, which is adjusted from the heads of the casing by set-screws, to insure a steam-tight joint against abutments.

The sliding abutments E have stems, which are provided with pistons, J, which work in the cylinders $k\ k$.

L is a steam-pipe, which connects these cylinders $k$ with the steam-pipe F.

By a lever-arrangement, seen in fig. 1, steam is admitted into the cylinders $k$, above the pistons J, when the abutments are raised by the inclined planes to their highest point, and after the piston-ends of the inclined planes have passed them, as seen in fig. 1.

When the piston has passed, the steam thus admitted forces the abutment down in contact with the circular portion of the inclined planes.

The cock $m$ in the small steam-pipe L is opened, when the piston has passed, to admit steam into the cylinder $k$, and closed when the abutment drops.

$n$ is a packing-plate, upon the inside of the casing, to insure a steam-tight joint against the inclined planes. This plate is made adjustable by set-screws.

The form of the inclined planes is such that the steam is cut off at the desired point of the stroke. This is accomplished by the circular portion marked $o$.

Having thus described my invention, I claim as new, and desire to secure by Letters Patent—

1. The arrangement of the cylinders $k\ k$, piston J J, steam-pipes L F, lever-arrangement and cock $m$, double abutments E, and partition-plate $h$, with relation to each other and the inclined planes C, as herein shown and described.

2. The adjustable packing-plate $n$, adapted to conform to the curve O of the inclined planes C, as herein shown and described.

THOMAS A. NIZER.

Witnesses:
OLIVER TRABER,
JOSEPH T. BROWN.